(12) United States Patent
Welin-Berger

(10) Patent No.: US 7,171,777 B2
(45) Date of Patent: Feb. 6, 2007

(54) DISPOSABLE TRAP

(76) Inventor: John Henrik Guy Welin-Berger, Box 44, S-740 82 Orsundsbro (SE)

( * ) Notice: Subject to any disclaimer, the term of this patent is extended or adjusted under 35 U.S.C. 154(b) by 177 days.

(21) Appl. No.: 10/362,491

(22) PCT Filed: Aug. 20, 2001

(86) PCT No.: PCT/SE01/01776

§ 371 (c)(1),
(2), (4) Date: Feb. 20, 2003

(87) PCT Pub. No.: WO02/15686

PCT Pub. Date: Feb. 28, 2002

(65) Prior Publication Data

US 2003/0172580 A1    Sep. 18, 2003

(30) Foreign Application Priority Data

Aug. 21, 2000    (SE) .................................. 0002960

(51) Int. Cl.
*A01M 23/34*    (2006.01)
(52) U.S. Cl. .............................................. 43/87; 43/85
(58) Field of Classification Search ............... 43/85–87
See application file for complete search history.

(56) References Cited

U.S. PATENT DOCUMENTS

| | | | | |
|---|---|---|---|---|
| 75,438 | A | * | 3/1868 | Marshall ........................ 43/86 |
| 173,798 | A | * | 2/1876 | Larson ........................... 43/87 |
| 936,808 | A | * | 10/1909 | Pozsonyi ....................... 43/86 |
| 1,323,400 | A | * | 12/1919 | Lokaj ............................. 43/87 |
| 1,496,421 | A | * | 6/1924 | Koranicki ...................... 43/85 |
| 1,858,096 | A | * | 5/1932 | Lementy ........................ 43/86 |
| 1,865,920 | A | * | 7/1932 | Knippelmeir .................. 43/87 |
| 1,899,641 | A | * | 2/1933 | Schwartz et al. .............. 43/86 |
| 2,348,002 | A | * | 5/1944 | Glass ............................. 43/86 |

(Continued)

FOREIGN PATENT DOCUMENTS

DE    1191167 A * 4/1965

(Continued)

*Primary Examiner*—Darren W. Ark
(74) *Attorney, Agent, or Firm*—Rolf Fasth; Fasth Law Offices

(57) ABSTRACT

The invention comprises a trap (1), adapted for small animals, generally shaped as a tunnel part (A), where one end area (1) of the tunnel part is shaped and adapted to a space (B), intended for a bait (100), where this space (B), in a direction with the tunnel and towards its other end area (A2), is demarcated by one or several mechanism-releasing means, such as threads (31), and where an open snare (32) is oriented, in any case close to the floor and wall sections of the tunnel, and positioned in a direction into the tunnel, is relationship to the mentioned means or threads (31), where the mentioned means of threads (31) are adapted to, via a pulling tensional force or corresponding, let a mechanism (2) constrict an open snare in an activated position, and at broken threads or similar, let the mechanism pulling the snare be deactivated, when the mentioned mechanism consists of a spring arrangement, among other things. A spring unit (2a) belonging to the spring arrangement is enclosed within a driving box (C). One end section (2a') of the spring unit is in joint function partly with the mentioned means or threads (31), partly with a band (32) serving the above-mentioned snare. The other end section (2a'') of the spring unit (2a) is in joint function with means extending the spring unit, like a pull-band (33) and that means-related or pull-band-related means is adapted in such a way that when the spring unit has an extended position (not shown), the spring unit (2a) may be locked in the mentioned extended position.

20 Claims, 3 Drawing Sheets

U.S. PATENT DOCUMENTS

| | | | | |
|---|---|---|---|---|
| 2,700,844 A | * | 2/1955 | Pastuck | 43/87 |
| 2,789,691 A | * | 4/1957 | Dobratz | 206/320 |
| 2,894,352 A | * | 7/1959 | McDonald | 43/87 |
| 3,908,302 A | * | 9/1975 | Carr | 43/121 |
| 4,179,837 A | * | 12/1979 | Gummeringer | 43/87 |
| 4,180,937 A | * | 1/1980 | Webster | 43/87 |
| 4,208,827 A | * | 6/1980 | Starkey | 43/87 |
| 4,250,653 A | * | 2/1981 | Davies | 43/87 |
| 4,363,184 A | * | 12/1982 | Marcolina | 43/85 |
| 4,425,732 A | * | 1/1984 | Kania | 43/85 |
| 4,462,182 A | * | 7/1984 | French | 43/85 |
| 4,513,527 A | * | 4/1985 | Wicklund | 43/87 |
| 4,578,893 A | * | 4/1986 | Wickenberg | 43/77 |
| 4,739,578 A | * | 4/1988 | Pitchford, Jr. | 43/87 |
| 4,827,662 A | * | 5/1989 | Dahlman | 43/87 |
| 5,062,237 A | * | 11/1991 | Kitagawa et al. | 43/86 |
| 5,746,020 A | * | 5/1998 | Fiore et al. | 43/85 |
| 6,101,761 A | * | 8/2000 | Sprick | 43/85 |

FOREIGN PATENT DOCUMENTS

| | | |
|---|---|---|
| DE | 9316948 U1 * | 3/1994 |
| FR | 2583617 A1 * | 12/1986 |
| JP | 91743 A * | 3/1992 |
| JP | 8-322452 A * | 12/1996 |
| WO | WO-01/76363 A1 * | 10/2001 |

* cited by examiner

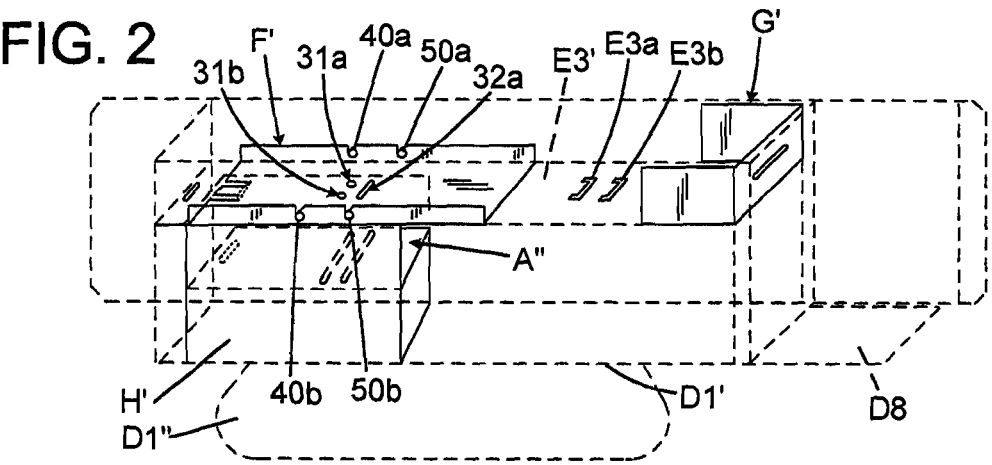
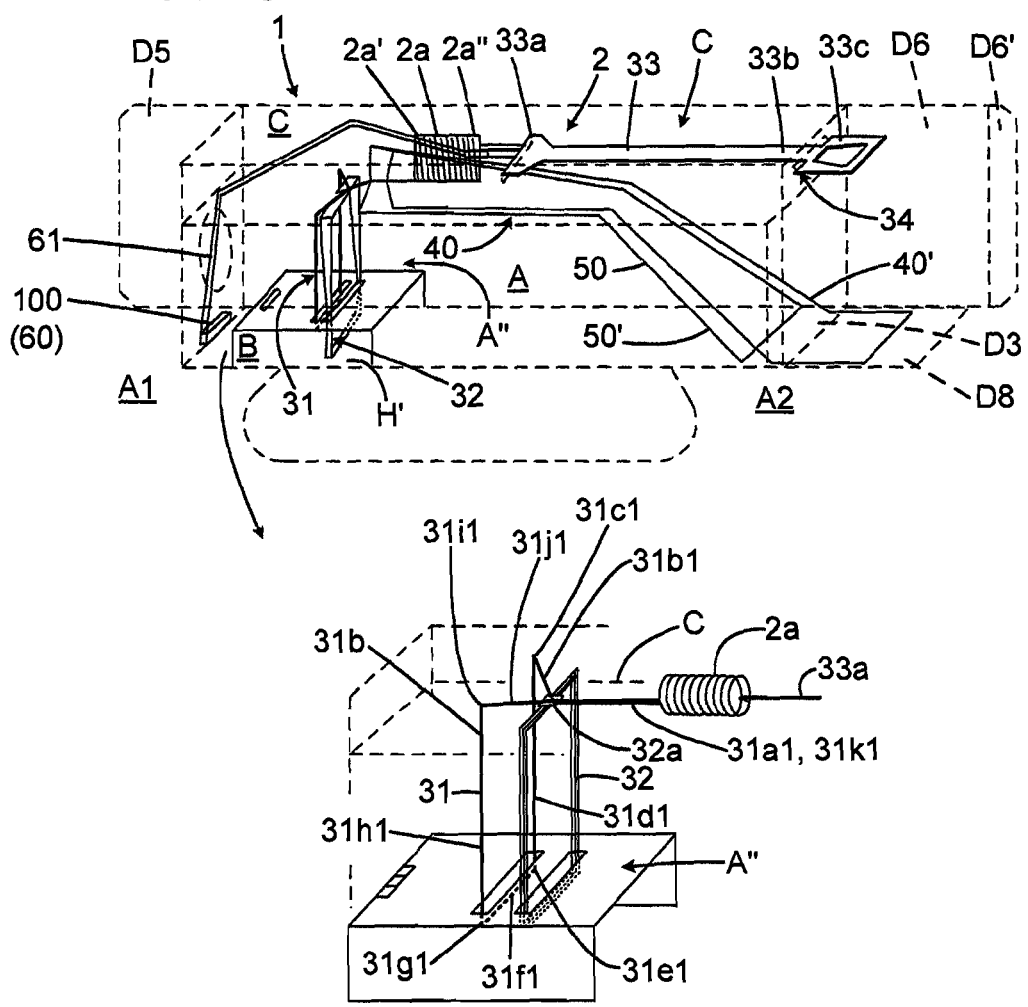

DISPOSABLE TRAP

TECHNICAL FIELD

The present invention generally relates to a trap, adapted to catch small animals, and more in particular to such a trap, which is especially adapted to be used as a trap, designed to be thrown away after its use, and which below will be mentioned as a "disposable trap".

More in particular the present invention relates to such a trap, adapted for catching small animals, which generally is shaped as an open cavity, one end section or -area of which is shaped and adapted to form a space intended for a bait, whereby this space is adapted to enclose or to be demarcated by a mechanism releasing means, such as one or several threads, and whereby an open snare arrangement is oriented, on the inside of the floor and wall parts, related to said cavity and placed in the cavity nearby said threads.

Said threads are further adapted to function in such a way that, when the trap is kept in an activated or a ready to use position and co-operating with an open snare and the trap is set in a position where it is to be released from said activated position by the movement of an animal, measures have been taken via a pulling force to hold a mechanism, which, when deactivated, tightens an open snare into an activated position, with the effect that in case of one or several broken threads, the mechanism adapted for pulling the snare will be deactivated and the snare is tightened around the neck area of the animal and strangling the animal in that way.

It should be noted that said mechanism as a rule may consist of a spring arrangement among other things.

The present invention is based upon a trap, adapted to fulfil the purpose of first of all, causing an anaesthesia and/or a killing of a mice, a rat, a snake, a lizard, a mink, a polecat and other small animals, which trap should consist of a first part (in the following called a tunnel), into which the animal enters, and a second part (in the following called the driving or control box), which is entirely or partly separated from said first part.

In any case said first, tunnel-shaped, part shall be made or formed in a size big enough to well contain the animal in question, and in the case of snakes and lizards, at least a part thereof.

Further, an alternative is offered in that said tunnel shaped part is formed as a box, which, primarily for hygienic reasons and in order to simplify the use of the disposable trap, will have the capacity of totally enclosing the captured animal. and whereby the box or container provides a mechanical protection when loading or activating the mechanism, which deactivated tightens an open snare.

BACKGROUND ART AND EARLIER STANDPOINT OF TECHNOLOGY

Methods and arrangements for the above mentioned purpose and with the above described characters or features are previously known in several different designs.

Generally speaking, it can be stated that traps and devices intended for the control of i.e. mice and rats are known in a large number and most of these are adapted to be used several times.

Thus, in any case, the following traps do belong to the technical standpoint and constitute the background art.

Snap Traps

These traps consist of a spring means, mounted on a wooden plate, with a clamp serving in a locking means and included in a locking mechanism, the clamp being deactivated or released as fast as an animal touches an applied bait.

Not infrequently, it happens that the clamp hits the paw, over the ear or the tail and the animal is than caused pain before it slowly dies.

The snap trap is also unhygienic as contamination usually falls down onto the floor and also when the animal is removed from the trap.

Cages

These traps are usually formed using a metal frame, which is surrounded by a metal net.

These have to be regularly emptied and looked after, if not any caught animal may starve to death and perhaps before they die they try to eat each other.

Glue Traps

These traps consist of a piece of cardboard coated with a strong self adhesive glue. The bait is fastened in the middle of the cardboard.

In order to reach the bait, the animal have to pass the glue surface and gets stuck thereupon.

This device is considered to cause cruelty to animals and its use is against the law and regulations in certain countries.

Poison

The use of different types of poison, as a poison sold under the trade name "Varfarin", results in that inside the animal, after eating, causes haemorrhages and the animal is subject to a slow dying process.

There is, however, a risk that minor haemorrhages arise primary, which do not cause a death, but cause disablement and suffering.

Suspicion has been brought forward that birds of prey may be injured by eating rats and mice, that have been either disabled or killed by eating poison.

Rigorous measures and steps are normally prescribed in order to protect domestic animals from injury.

Later findings have indicated that rats are able to develop a certain resistance to these poisons and are hereby able to store high concentrations of this poison in the body.

Various other devices have also been developed during a long time with the purpose of catching small animals.

Most of those devices have been constructed with the purpose in mind to catch the animal and, if possible, kill it, however, without deeper consideration of its suffering.

During the last decade, it has been suggested the use of a trap consisting of a small plastic box, with a shutter at its gable, which is caused to close by the use of and the activation of a release mechanism, when the animal has entered into the box.

The animal will have to stay in and is trapped in a narrow space until it possibly is killed and removed.

It is also previously known that the risk of infection and hygienic problems are associated with the fighting against and catching mice and rats in several ways.

It is also previously known that "Hanta-virus" is to-day causing pneumonia, dangerous to human beings and which may be spread by inhaling the air surrounding any infected mice.

According to given recommendations in the USA, infected animals are therefore exterminated with flamethrowers and the use of gas masks.

Infected mice of this kind have been observed in South America, in China and in North Korea, and it has already been documented that the spreading is directed into new areas.

It is also previously known, due to the fact that mice and rats often live in an infected environment caused by dead animals, blood, urine or excrements, that the handling of snap traps, cages, glue traps and several other catch devices requires a number of hygienic precautions like the washing of traps and cages, floors and buckets.

It is also apparent that the risk of contamination via blood, urine or excrements has been considerable, as it is difficult to avoid a direct contact with different contaminated parts of the trap after the killing of the animal and during a removing of it from the trap.

It is also previously known a disposable snare trap, with the characteristics described in the preamble of claim 1, and where a snare is used for killing the animal with the use of a latch device, i.e. a string that prevents the snare from releasing until the animal has bitten off the string to reach a bait placed behind the string.

An example of such a trap is more closely shown and described in the international patent application serial number PCT/SE 89/00589, under publication number WO 90/04920.

A disadvantage associated with this previously known trap is the fact that the different parts are openly exposed and can therefore cause injury on hands and fingers during priming or activating.

It has been shown that delicate and sensitive mechanisms sometimes have been affected to the extent that they have been incapable of functioning.

Previously known designs of the trap have basically not been suitable for placing it outdoors, as the trap has been open and therefore the interior has been reachable by birds and domestic animals.

When setting up the trap in composts, it has been desirable to cover the trap with leaves or earth, with the risk that the trap being rendered totally out of order.

CONSIDERATIONS RELATED TO THE PRESENT INVENTION

Technical Problems

Considering the fact that the technical considerations, which a skilled person within this technical field has to make in order to be able to offer a solution of one or several of the hereunder raised technical problems, initially will require a knowledge of the measures and/or the sequence of measures which are to be taken, as well as a necessary choice of the measure or measures required, and because of this, the subsequent technical problems will likely be relevant when bringing forth the present invention.

Considering the previously mentioned background art or standpoint of the technique, as it has been described above, it has to be regarded as a technical problem to realise the importance of and the advantages associated with allotting a disposable trap for small animals, which is generally shaped as a tunnel and close to and adjacent to this tunnel is a control box situated, said control box is able, among other things, to enclose a used spring arrangement.

Thus, there is a technical problem in being able to realise the importance of and the advantages associated by being able to allot a simple construction of a trap for small animals, where the trap has been given the form of a disposable trap and with the animal thus killed enclosed in the tunnel.

There is furthermore a technical problem in being able to assembly and to put together and structure or design a disposable trap in such a way, that it becomes stable in shape and can resist the tension from a spring arrangement, and that it shall consist of a material with good moulding properties.

There will also be a technical problem to be able to create a disposable trap with good moulding properties, and which by a release of an activated mechanism for killing the animal also will be able to offer an effect on other parts, so the animal will automatically be fully enclosed in the tunnel in a hygienic manner.

There is also a technical problem in being able to create such conditions that a gnawn off and broken thread will activate a mechanism for tightening said snare for a quick constriction of said snare around the neck area of the animal to create conditions for a strangulation, and via this mechanism and a number of threads or bands, make it possible to have the caught animal well packed within the tunnel.

There is a technical problem in understanding the importance off and the advantages associated with letting a spring unit, belonging to said spring arrangement, be enclosed within a specially shaped control box, which is separated from a tunnel section shaped and adapted for the animal, through which one end part of the spring unit will be able to be in joint action, in any case partly, with said threads, partly with a band serving as said snare, while the other end part of the spring unit should be able to be in joint action with an extending means of the spring unit in the shape of a "pulling rod", whereby said means extending the spring unit or the pulling rod is adjusted to be lock in said extended or stretched position of the spring unit, when fully extended in the mentioned stretched or extended position.

There is then a technical problem in being able to realise the importance off and the advantages associated with the steps of letting the mentioned pulling rod to be arranged to pass a slot in a gable part, close to the other end area of the tunnel belonging to the control box.

There is then a technical problem in being able to realise the importance off and the advantages associated with letting said pulling rod or band expose, in any case one, a hook shaped projection close to the spring unit, adapted to pass said slot in the displacement direction, adapted to expanding the spring unit, and then, as a support against any compression of the spring unit, be able to be fixed as a stop against said gable section.

There is then a technical problem in being able to realise the importance of and the advantages associated with letting one end section of the spring unit be in a joint action with said thread, one end section of which is attached or secured to one end section of the spring unit, and whereby a first thread portion is adapted to run or extend through the control box, a second thread portion is adapted to run or extend through a first hole in the bottom section of the control box and/or the ceiling part of the tunnel part, a third thread portion is adapted to be able to constitute a demarcation or form a space for a bait, a fourth thread portion is adapted to be able to run or extend through a first hole in the bottom part of the tunnel part or the like, a fifth thread portion is adapted to be able to run or extend transversely and below the bottom part, a sixth thread portion is adapted to be able to run or extend through a second hole transversely oriented to said first hole in the tunnel part in its bottom section or corresponding, a seventh thread portion is adapted to be able to constitute said demarcation of the space for the bait, and an eighth thread portion is adapted to be able to run or extend through a second hole in the bottom section of the control box, and/or the ceiling section of the tunnel section, a ninth thread portion is adapted to be able to run or extend within the control box, the other end section of which also is adapted to be able to be attached to one end section of the spring unit.

There is then a technical problem in being able to allot the use of a second band, attached to the first end section of the spring unit, and which via opposing side-oriented holes within the control box, should be adapted, as a loop, to run or extend in a direction towards and to the other end area of the tunnel part, to connect at this place via holes to the other end area of the tunnel part.

There is then a technical problem in being able to realise the importance of and the advantages associated with utilising another band, a third band, which also is attached to the first end section of the spring unit, which via opposite oriented and side related holes within the control box should be adapted to, preferably as a loop or sling, run or extend in a direction towards and to the other end area of the tunnel part, and there, via holes in the gable of the control box, alternatively the bottom section of the control box, constitute an open snare within the other end area of the tunnel.

There is then a technical problem in being able to realise the importance of and the advantages associated with the chosen dimension, which is required in order to resist the forces that occur at a deactivation of the mechanism that constricts the snare by a gnaw off thread and thereby causing a quick constriction of the expanded spring unit towards the other end area of the tunnel part, so that said gable part will turn or swing in order to stay in a closed position.

Further, it can be regarded as a technical problem to be able to realise the importance of and the advantages associated with that such a deactivation of the mechanism for constricting the snare, being adapted to bring into the tunnel part a tail section belonging to a captured small animal.

There also is a technical problem in being able to realise the importance of and the advantages associated with letting one end area of the tunnel part be provided with a gable part, serving, apart from said threads, as a further demarcation or restriction of said space intended for the bait.

There is then a technical problem in being able to realise the importance of and the advantages associated with letting said gable part, serving as a further demarcation or restriction, be supplied with an opening and in this way offering an alternative in letting the opening be covered with a transparent layer to give the optical impression that the tunnel consists of an open tunnel.

There is then a technical problem in being able to realise the importance of and the advantages associated with letting the bottom section of the tunnel part, within the area for said snare, be formed as or equipped with a platform, which reduces the cross-sectional area of the tunnel.

There is then a technical problem in being able to realise the importance of and the advantages associated with the co-ordination, which is required, to get a is small animal to be enclosed, entirely enclosed, in said tunnel after deactivation of the mechanism constricting the snare, and the quick contraction, which then takes place of the spring unit in the direction towards the other end section of the tunnel part.

There is also a technical problem in being able to realise the importance of and the advantages associated with having the tunnel and its parts being constructed of a folded first cardboard material, and that the control box will be formed by a folded second cardboard material, and where the control unit can then be placed within the upper section of the tunnel.

There is also a technical problem in being able to realise the importance of and the advantages associated with letting the first cardboard material show side-oriented flaps or wings, connected via perforations and folding lines, and where the folded second cardboard material will form coverage for the holes, which are formed by the flaps or wings in the first cardboard material.

Then there is a technical problem in being able to realise the importance of and the advantages associated with letting said second band and said third band be made like loops and oriented close to or adjacent to and fastened to side sections of the second cardboard material at the other end area of the tunnel part and the gable belonging to it.

There is then a technical problem in being able to realise the importance of and the advantages associated with letting said control box, preferably via a control box related means, be allotted with at least two side oriented and opposite flaps, each flap supplied with, in any case of, two holes, designed to be able to deflect the second and the third band, when these run or extend towards the other end section of the tunnel part.

There is also a technical problem in being able to realise the importance of and the advantages associated with letting said flaps and the connecting holes to be centred, or in any case mainly placed in the centre, in relationship to said snare.

There is also a technical problem in being able to realise the importance of and the advantages associated with letting the second end area of the tunnel or the tunnel end section show a first, a flat, from said bottom part extending gavel part, having a length in any case somewhat exceeding half the height of the tunnel.

There is also a technical problem in being able to realise the importance of and the advantages associated with letting said gable part with its folding line be connected to the bottom part of the tunnel.

There is also a technical problem in being able to realise the importance of and the advantages associated with letting the second end area of the tunnel part expose or show a second gable part in joint function with the side part of the tunnel part, with a length adapted to the width of the tunnel.

Further, it must be regarded as a technical problem to let the mentioned second gable part, with its folding line, be connected to one side section of the tunnel.

There also is a technical problem in being able to realise the importance of and the advantages associated with letting the second gable section, by means of a further folding line, be completed with a narrow lip.

Solution

The present invention emanates from the prior art stated in the introduction and more closely defined in the preamble of claim 1.

To be able to solve one or more of the above stated technical problems, the present invention especially exposes that the known technique, having reference to a trap adapted to small animals, should be completed so that a utilised cavity should have the shape of a tunnel, that a spring arrangement should comprise a associated spring unit, and that this spring unit should be enclosed as a unit within a control box, situated close to and above a tunnel or a tunnel part.

Further, one end part of said spring unit should have a joint action, partly with threads within the tunnel part to demarcate or separate a space for a bait, partly with a band, serving as said snare, and that the second end of the spring unit should be in joint action with means, capable of extending the spring unit, like a pulling rod, and that a pulling rode related means should be adapted to lock the spring unit in an extended position.

As suggested embodiments, falling within the scope of the basic idea of the present invention, it is assigned that said pulling rod should be arranged to pass a slot in a gable part of the control box, related to the second end area of the tunnel part.

Furthermore, it is assigned that said pulling rod should show one or several hook-shaped projections close to the spring unit, adapted to be able to pass through said slot in one moving direction and thereafter as a support and a stop be able to lie close to and support against said gable part.

Furthermore, the invention assigns one end part of the spring unit to be in cooperation with said thread, running like a loop, the first end part of which is connected to the first end part of the spring unit and where a first thread section should run or extend within the control box, a second thread portion should run or extend through a first hole in the bottom section of the control box, a third thread portion should form a demarcation or separation of the space for the bait, a fourth thread portion should run or extend through a first hole in the bottom section of the tunnel or corresponding bottom part, a fifth thread portion should run or extend below the bottom section, a sixth thread portion should run or extend through a second hole in the bottom section of the tunnel or corresponding bottom part, a seventh thread portion should form said demarcation or separation of the space for the bait, an eighth thread portion should run or extend through a second hole in the bottom section of the control box, a ninth thread portion should run or extend within the control box and its second end part should also be connected to the first end part of the spring unit.

Furthermore the invention assigns that a second band should be attached to the first end part of the spring unit and via side oriented holes in the control box, this second band being adapted to run or extend in a direction towards and to the second end area of the tunnel part, in order to, through holes in the bottom part of the control box, be connect to a gable section for the second area of the tunnel.

A third band is fastened to the first end part of the spring unit and via side oriented holes in the control box, this third band is adapted to run or extend in a direction towards and to the second end area of the tunnel part to form in that area an open snare.

By a deactivation of the mechanism that constricts the snare said gable part will assume a closed position.

By a deactivation of the mechanism that constricts the snare said open snare will bring in a tail part belonging to a caught small animal.

Furthermore, the invention assigns that one end area of the tunnel part should be equipped with a gable section serving as a demarcation or separation of the space intended for the bait.

Said gable part should then be supplied with an opening, where the opening may be covered by a transparent layer.

The bottom part of the tunnel part is, within the area for said snare, formed as or supplied with a platform.

The invention also assigns that at a deactivating of the mechanism, which constricts the snare, the small animal will be totally enclosed in the tunnel part.

The tunnel part and the control box should be shaped by a folded first cardboard material and the control box should be shaped as a demarcation or separation by a folded second cardboard material and thereby the control box will be placed inside the upper area of the tunnel part.

The first cardboard material can then show side oriented flaps or wings, connecting via folding lines.

A second band and a third band are both coordinated with each other at or adjacent to a folding line between the second end area of the tunnel part and the gable belonging to it.

The control box or a means allotted to the control box should also show in any case two side oriented flaps, each flap supplied with, in any case, two holes, whereby the holes are intended to be able to deflect a second band and a third band both running or extending towards the second end part of the tunnel part.

Furthermore, it is assigned that said flaps and/or said holes, should be centred, or in any case placed mainly at the centre, in relationship to said snare.

The second end area of the tunnel should show a first, a flat, gable part with a length somewhat exceeding half the height of the tunnel.

Said gable part is connected with a folding line to the bottom part of the tunnel part.

Further, it is assigned that the second end area of the tunnel part should show a second gable part, with a length adapted to the width of the tunnel part.

Said second gable part is connected via a folding line to one side section of the tunnel part and said second gable part is via a folding line completed with a narrow lip.

Advantages

The advantages, which may be considered to be characteristic for a trap intended for small animals, according to the present invention and the in this way assigned special significant characteristics, those advantages consist of conditions to create an effective disposable trap with a mechanism, specially adapted to be able to kill a caught animal via a quick constriction of a snare around the neck part of the animal, which also will be able to be used to close the trap, and so in a hygienic way have the animal packaged.

A caught and killed animal, enclosed in a tunnel part of the trap together with the rest of the trap, may be disposed of as a package.

Further, the trap and its separate parts have been constructed from materials, which are well adapted for a rapid process of decay.

The assignment of a light inlet tunnel part adapted for small animals, and the use of a separate control box, offers a compact unit, which is easy to work with, and it may in an easy way be brought into an activated position.

The control box also offers the addition of other means and measures.

What, above all, may be regarded to be characteristic for a trap, according to the present invention, is stated in the characterising part of the succeeding claim 1.

BRIEF DESCRIPTION OF THE FIGURES

A number of presently suggested forms of embodiments, showing the significative characteristics related to the present invention, will now be further described for an exemplifying purpose with a reference to the enclosed drawings, where:

FIG. 2 shows in a corresponding perspective view of a second embodiment of a trap adapted for small animals, also without a mechanism, adapted for constricting an open snare, and the belonging strings and bands, FIG. 3 shows in a perspective view a mechanism, adapted for constricting an open snare, in a deactivated position with necessary strings and bands only schematically drawn and shown.

DESCRIPTION OF THE NOW SUGGESTED EMBODIMENTS

By way of introduction it has to be emphasised that in the following description of a presently suggested embodiment, which shows the significant characteristic features associated with the invention, and which is made clear by the figures in the following drawings, we have chosen terms and a special terminology with the purpose of thus, at first hand, have the idea of the invention made clear.

It has, however, to be observed that the expressions here chosen should not be regarded as confined only to the utilised and chosen terms here, on the contrary, it should be understood that every term thus chosen should be interpreted in such a way that in addition to that, it comprises all technical equivalents which function in the same or mainly in the same way in order to be able to achieve the same or essentially the same intention and/or technical effect.

Figure 1:
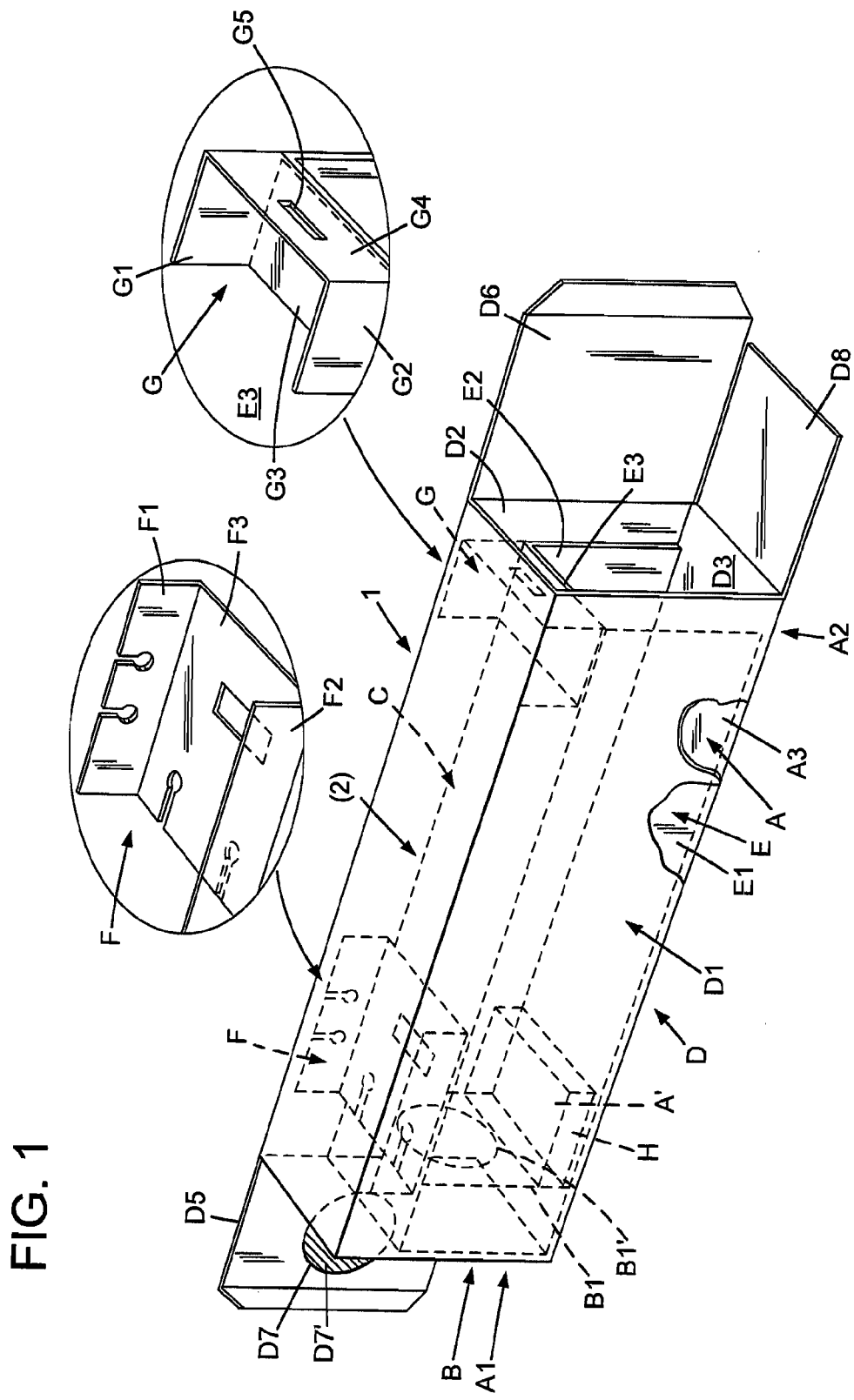
FIG. 1 shows in a perspective view a first embodiment of a trap adapted for small animals where a mechanism, adapted for constricting an open snare, has been removed together with a necessary string loop or sling for releasing the mechanism and necessary bands, in order to simplify the illustration in this way of the construction of the remaining construction parts of the trap as concerns to a tunnel part specially adapted for an animal and a control box oriented above the tunnel part.

With reference to FIGS. 1 and 2 there are shown in a schematic way the present invention in two different embodiments, whereby the significant features associated with the present invention have been generally made concrete or clear, through the now suggested embodiments, more closely described in the following.

Thus, FIG. 1 shows in a perspective view and in an open position, a trap adapted to small animals, where a mechanism adapted for constricting an open snare with releasing strings and bands related to the mechanism have been removed for an elucidatory purpose.

The trap 1 is thus consequently formed, as a general point of view, and shaped as a tunnel part A, whereby a first end area A1 of the tunnel part is shaped to and adapted for a space B, intended for a bait (not shown).

In a direction into the tunnel part, from the first end of which or the first end area A1 and towards its second end area A2, there thus exists the space B and this is demarcated or separated by a partition B1 provided with a hole or aperture B1'.

This recess should be "covered" by or demarcated by one or several, usually in parallel oriented, threads 31, which is further shown in FIG. 3, and where an open snare 32, also shown in FIG. 3, is oriented, in any case close to the floor and wall parts of the tunnel part A and placed in a direction into the tunnel part, in relationship to said threads 31.

Figure 4:
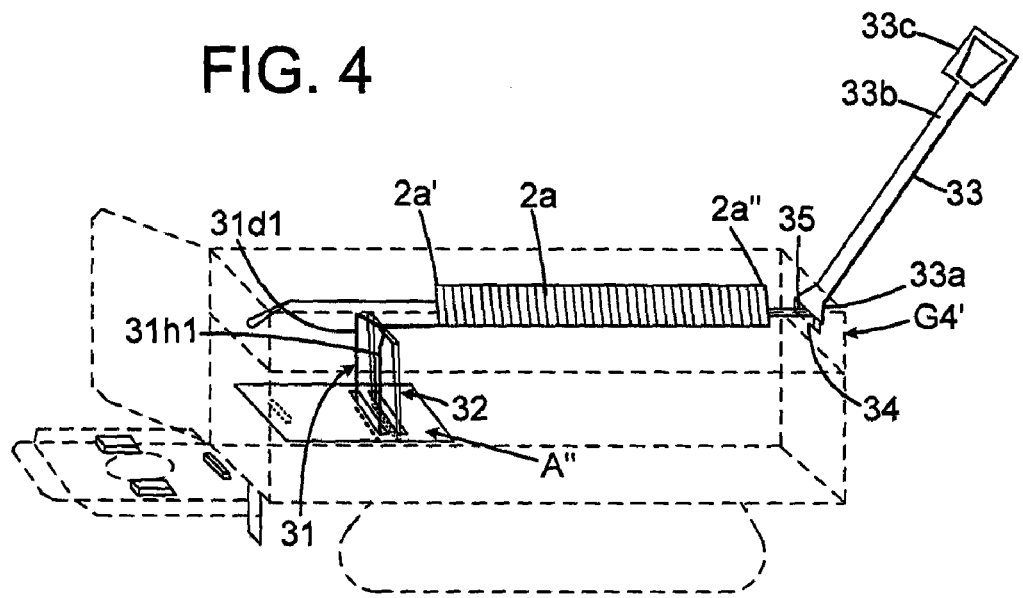
FIG. 4 shows the mechanism, adapted for constricting the open snare, in an activated position where a utilised spring unit occupies an expanded position and is kept in this position by among other things a stretched string, attached at one end to said spring unit and at the other end by a support and, FIG. 5 shows said mechanism in a deactivated position, initiated by a small animal, like a rat, when it has gnawn off the string and as a result gets killed by strangling and entirely enclosed and wrapped up in the trap.
Figure 5:
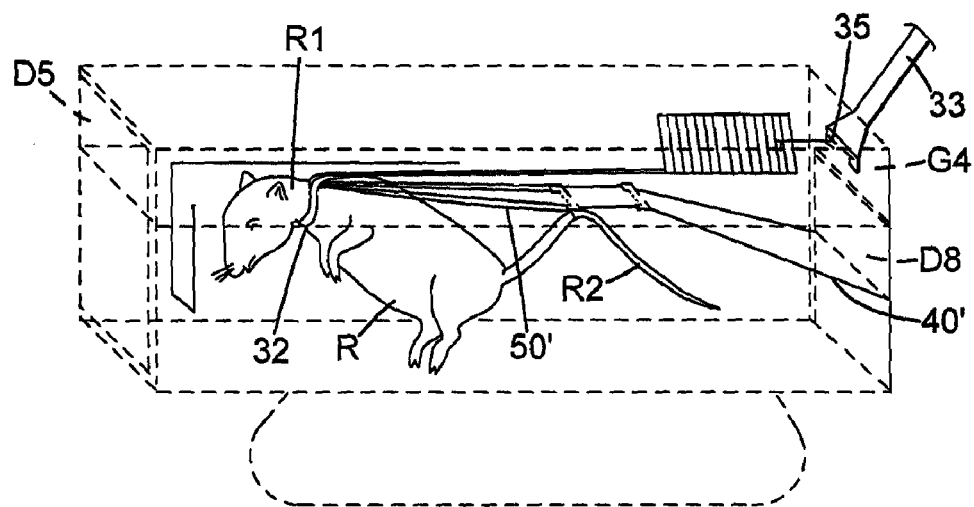

Said threads 31 are adapted to act, via a pulling tensional force, and to cooperate with a mechanism 2, adapted to constrict an open snare in a fixed and activated position, according to FIG. 4, and at one or several broken threads 31, according to FIG. 5, let the mechanism 2 which activates the snare to be deactivated, when said mechanism consists of, among other things, a spring arrangement.

The mechanism, adapted for constricting the open snare, has been given the general reference numeral 2.

FIG. 1 also illustrates the design of a space C, which serves as control box to enclose, among other things, said mechanism 2, adapted for constricting the open snare.

The control box C is designed within a package D, with a rectangularly shaped cross-section, by way of inserting, and preferably fastening, a unit E bent to a "U", with the side parts or sections or legs E1 and E2 of the unit attached to side sections D1 and D2 of the package D.

The unit E shows a part E3 connecting the upper parts of the side sections E1 and E2, which then serves as a bottom part for the control box C or a ceiling section for the tunnel part A.

To the part E3, connecting the side-sections within the control box, a means F is coordinated or fastened (shown somewhat enlarged in FIG. 1), primary intended to form deflections for threads and bands by means of different holes or apertures.

The means F exposes opposed side sections F1 and F2 and shows here as well a section F3 which is connected to said side sections.

A further means G is fastened within the control box to the section E3, which connects the side sections alternatively to the side sections D1 respectively D2, and shows side sections or legs G1 resp. G2 and a section G3 connecting the legs and a gable section G4.

The gable section G4 is provided with a centrally situated slot G5.

Close to the first end area A1 of the tunnel part A is to be found further means H, in FIG. 1, connected to the bottom section A3 of the tunnel part A, where it forms a cross section constriction of the tunnel part, given the reference numeral A', in connection with the threads 31 and the snare 32.

The means H also shows a wall part, delimiting and shutting off the tunnel part A, equipped with an opening B1', which is connected to an opening D7 formed in a gable D5, the opening D7 is advantageously covered with a transparent material D7'.

One the end area of the package D is provided with the said gable D5, while the other end area of the package is provided with a gable D6, both gables connected to the leg or the side section D2.

A flap D8 is connected to a bottom part D3.

With reference to FIG. 2, it is shown here how a means H' has been allotted a somewhat larger height than the means H in FIG. 1, and where an obtained canal constriction A" therefore is shown and indicated as more pronounced in FIG. 2 compared to FIG. 1.

Also FIG. 2 shows the utilisation of a means F' and a means G', like the one in FIG. 1, however with somewhat changed form of embodiments.

Corresponding parts have nevertheless been given corresponding reference numerals.

However, it should be emphasised that the section E3', connecting the legs, has been designed with two transverse and somewhat U-shaped slots E3$a$ and E3$b$ respectively.

Further, it is shown here that a section D1' of the leg or side section D1 (and also the side section D2) cooperates with the bottom section D3 via a folding is line to form one or two supporting edges D1".

If one or both of the sectors D1' (also on the other side D2) are utilised, as the FIG. 2 illustrates, the risk of tipping over will be reduced for the unit or the trap.

With reference to FIG. 3 a mechanism 2, adapted for constricting an open snare, is shown here in a schematic way and where utilised threads, strings or bands are shown in a schematic way.

It is evident to any skilled person within this technical area where in the construction threads should be used to advantage, where strings could be used to advantage and/or where bands best could be used.

A spring arrangement 2, having a spring unit 2a, has this spring unit completely enclosed in said control box C.

The first end section 2a' of the spring unit 2a is in joint action, partly with one or several threads, in the example of the embodiment illustrated as a thread loop 31, partly with bands serving as said snare, has been allotted the reference designation 32.

Both said threads 31 and said bands 32 are take the form of a loop, running through recesses in means F', where two recesses for said thread loop 31 have been assigned the reference numerals 31a and 31b respectively, and where a recess for the band 32 has been assigned the reference numeral 32a.

The second end section 2a'' of the spring unit 2a is in joint action with a means extending from the spring unit 2a, illustrated as a pulling rod 33.

The first end section 33a of the pulling rod 33 cooperates with the end section 2a'' of the spring unit in a known manner, while its second end section 33b shows a handle 33c, designed as a one hand grip.

A pulling rod related means 34, fixedly attached to the trap, in the form of a slot G5 in the gable section G4 of said means G, is adapted to lock the end section 2a'' of the spring unit 2a when it is fully extended, shown in FIG. 4.

Said pulling rod 33 is thus arranged so as to pass, by a pulling force, through the slot G5 in a gable section G4 belonging to the control box, close to the second end area A2 of the tunnel part and reinforced by side sections G1, G2 and a bottom section G3.

More in particular, it is evident from FIG. 4, that said pulling rod 33 shows one or several hook-shaped projections 35, oriented close to the spring unit, adapted to pass and penetrate said slot G5 when said pulling rod is pulled in the direction of displacement in order to stretch and expand the spring unit 2a, and then as a stop and support towards means 34 be able to lie close to said outer surface of the gable section G4'.

One of the end sections 2a' of the spring unit 2a cooperates with said thread 31, adapted for the release of the spring mechanism 2, where the first end section 31a1 of the thread is attached to the first end section 2a' of the spring unit. A first thread portion 31b1 runs or extends a distance through the driving or control box C, a second thread portion 31c1 runs or extends through a first hole 31a in the bottom section of the control box C, a third thread portion 31d1 forms said demarcation or a separation of the space B for a bais 100. A fourth thread portion 31e1 runs or extends through a first hole in the platform or canal constriction A'', a fifth thread portion 31f1 runs or extends below the platform or canal constriction A'', a sixth thread portion 31g1 runs or extends through a second hole in the platform or canal constriction A''. A seventh thread portion 31hi also constitutes the demarcation or separation of the space B for the bait 100. An eighth thread portion 31i1 runs or extends through a second hole 31b in the bottom section of the control box, a ninth thread portion 31j1 runs or extends a distance within the control box, its other end section 31k1 of the thread is also attached to the first end section 2a' of the spring unit 2a.

A first band 32, constituting the mortal snare, is arranged to run or extend along the control box C as different band portions, through a slot 32a in order to form, within the constricted cross section A' of the tunnel part, an open sling or loop extending along the side sections E1 and E2 and extending over the upper surface of the means (H or H').

A second band 40 is attached to the first end section 2a' of the spring unit, and via opposite and side oriented holes 40a and 40b respectively in the side sections of means F' in the control box C, this second band 40 is adapted to run or extend in a direction towards and to the second end area A2 of the tunnel part, in order to, by hole or a shown slot E3a in the control box C, be connected to a gable section D8 for the second end area of the tunnel part.

The second band 40 is shaped as a sling or a loop with a first portion running or extending, via the hole 40a, towards a hole E3a in the section E3', and as a second portion running or extending along the bottom section of the control box, passing through said slot E3a in order to form a part portion, and with a part portion passing the bottom section D3 close to the second end area A2 of the tunnel part in order to deviate upwardly as a part portion towards the slot E3a, and as a part portion run or extend to a hole 40b in said means F', and as a part portion be attached to the first end section 2a' of the spring unit.

A third band 50 is attached to the first end section 2a' of the spring unit and runs or extends towards side-oriented holes 50a and 50b respectively, in the control box or in said means F'.

This third band runs or extends as a sling or loop, adapted to extend in a direction towards and to the second end area A2, in order to, at this place, via holes in the side sections or other holes of the control box C, such as slot E3b, form an open snare within the second end area A2 of the tunnel part.

While the second band 40, constituting the second sling or loop 40', primary is intended to close the gable or flap D8, the third band 50, constituting the third sling or loop 50', primary is designed to bring and pull in any tail portion positioned outside the trap.

The third band 50 shows, in a similar way as the second band, band portions oriented in the same way as shown in FIG. 3.

With reference to FIG. 4, there is shown that by a deactivation of the mechanism 2, causing a constriction of the snare 32, which happens when an animal has gnawed off one of the portions 31d1, 31h1 of the thread 31, and due to the ceasing counter force on spring unit 2a, the spring unit will be compressed or constricted to the position shown in FIG. 5.

The result of this deactivation is shown in FIG. 5 and takes place when a small animal R has bitten off the sling or loop 31, with the effect that the first end section 2a of the spring unit 2a is released, and the whole spring unit is displaced towards the gable section G4.

This displacement movement of the spring unit 2a quickly constricts the snare or loop 32 around the neck section R1 of the animal R, and simultaneously, said gable section D8 will, via the sling or loop 40', take a closed position, and via the sling or loop 50' the tail section R2 of the animal R, will be lifted up and brought into the tunnel part.

The lengths of these slings or loops 40' and 50' are adapted in a way such that the sling or loop will be able to give the animal R the definite or final position as shown in FIG. 5.

The first end area A1 of the tunnel part is provided with a gable section D5, serving as a demarcation or a separation of said space B, intended for the bait 100.

The tunnel part A is formed from a folded first cardboard material and the control box is formed from a folded second cardboard material, the latter being placed into the first and constituting the tunnel part.

Nothing prevents letting said second band 40 and said third band 50 be coordinated with each other close to a folding line between the second end section of the tunnel part and the gable belonging to it.

The second end area A2 of the tunnel part shows, via the package D, a first, a flat, gable section D8, with a length somewhat exceeding half the height of the tunnel, and this gable section evidently can be extended so as to correspond approximately to the height of the tunnel.

The gable section D8 is thus connected, via a folding line, to the bottom section D3 of the tunnel part.

The second end area A2 of the tunnel part shows a second gable section D6, with a length adapted to the width of the tunnel, and where the second gable section is connected to the first side section of the tunnel by a folding line.

The second gable section D6 is by means of a folding line supplemented with a lip D6'.

Accordingly, the trap consists optically seen in principle of an open tunnel part, through which the animal enters through the one open end, and where, near to its other, closed end, strings or threads 31 are to be found, which are put up in such a way that they block the passage into the space B.

Beyond these strings or threads 31 a small package is fixed containing a bait 100.

This package has in FIG. 3 been allotted the reference numeral 60, and via a band 61 said package 60 is torn apart with the effect that the bait is exposed.

Said strings or threads 31 and the snare 32 run or extend through one or several holes in the ceiling of the tunnel part and in the bottom section of the control box, into which the strings and the snare slings respectively, are inserted into the hook of the spring unit.

Into this hook, the slings forming bands or threads, which are united with a trap door via the entrance opening, is inserted, as well as another band to the trap door, which covers a window at the closed end.

Into the other end (spring eyelet) of the spring unit, partly said pulling rod or band 61 is fastened, and partly an extension of a cover film (detachable), which emanates from the bait package 60.

The Invention Indicates the Use of a Millboard or Cardboard Construction.

In order to allow the use of a strong spring unit, to serve as the driving power for all operating systems, a solid cardboard (plastic) construction is required.

By joining together a lower part with an upper part along side folds on both of them and forming a tunnel and a control box respectively, the necessary stability is achieved. Additional reinforcement may be obtained by inserts of plastic or cardboard plates respectively.

The front end of the tunnel (where bait 100 is fastened) is closed by a gable provided with a window. The unit formed in this way may be enclosed and sealed into a box, offering additional stability.

The Bait

The bait is enclosed in a small plastic package shaped as a plastic cup or a plastic bag, provided with a tear off lid or alternatively a flap, supplied with one or several holes and a tear off cover film (Peel film). The uncovering and activation of the bait takes place at the same time as the priming or loading function and is caused by tearing-off the cover film. In case the trap is equipped with several different baits, the activation takes place after a choice of a suitable kind, by pulling a band (on the outside of the package). The active time of the bait is rather long as it is enclosed in the bag and the smell or odour has to pass successively through the uncovered holes.

The Thread Arrangement

This is mounted in such a way that one or several of its slings or loops block the free passage through the tunnel with the effect that the animal has to bite is off at least one thread to reach the bait. In order to reduce the cross section area of the passage a cardboard section (H, H') has been mounted, which also contributes to the stability of the construction.

The threads or utilised strings are impregnated with taste substances in order to further stimulate the animal to chew off one of the strings.

The Snare

When the threads, which hold the snare in a locked and in an open position, have been bitten off, the blocking of the spring is released and the spring is contracted, so strangling the animal by the band forming the snare. The position of the snare along the neck is determined by the distance to the jaw biting off the string. In order to allow effective catching of animals of different size (different distance between jaw and neck), the snare may be in the form of several slings at different distances from the jaw.

The Spring Unit

The spring unit is equipped at one end with a hook, in which threads, the band for the snare, string and i.e. bands to a front flap, bands to a back flap, bands to a tail retractor as well as bands to a container and buzzer-microswitch are fastened. The other end of the spring is provided with an eyelet- to which the pulling rod 33 in the form or shape of a pulling band and the cover film band for the bait are attached.

Pulling Rod

The pulling rod has the form or shape of a band 33 and consists of a strong band, punched from a plastic material, which is foldable and thereby, through spring effect, giving round-folded locking flaps 35, causing a blocking effect on the pulling band at the passage through a slot, which forms a locking mechanism for blocking the pulling band.

Tail Retractor

The tail part hanging or extending out will be pulled in by a band, attached to the spring hook.

Back-Flap

It is closed by a band, attached to the spring hook, after the tail retractor has been activated. In this way, the tunnel is closed.

Front-Flap

The front end of the tunnel part is closed by a gable, supplied with a plastic window. After a catch, a flap is closed and formed for covering the window and preventing other small animals to look into the trap.

Inspection Flap

On one gable, at the height of the animal's neck, there is an access flap, when open allowing a view through a plastic window—for checking that the animal has been correctly killed.

Box

The box or container enclosing the lower and upper parts (=the tunnel+control box) is provided with 2 gables, equipped with flaps by which the package may be totally closed after a catch. At the front end, it is supplied with a front flap (mentioned above). On its long sides, the box is supplied with outwardly foldable wings, which may be pulled out and down for increasing the stability towards the ground.

Container

A container, placed in the control box for disinfecting and decomposition agents, for chemicals suitable for anaesthesia or killing, consists of a small plastic bag, provided with an opening band inserted into the spring hook, so that the bag will be opened at the contraction of the spring and its contents are emptied over the animal through an opening in the control box tunnel.

In case the contents of the bag are intended to react with another chemical, the contents of the bag are poured over a cloth impregnated with chemicals, leading to the development of a gas for the intended effect.

Spray-bottle

A spray-bottle mounted in the control box may have similar effect as the container above—being connected to the spring unit for release.

Photocell-microswitch

For catching animals without teeth, with which they would be able to gnaw off a string (for activating the snare), a photocell (or a microswitch) has been placed into the control box, in one embodiment connected to a battery and an electromagnet in the control box, said electromagnet releasing the catch for the snare so as to constrict the snare around the neck of the animal. In a corresponding way, a spray-bottle with anaesthetic enclosed in the control box may be released.

Warning Device

Acoustic, optic and wireless (radio-) alarms have in common that they are released or activated by the animal entering the trap, which affects a photocell, a microswitch or a sensor of some kind to indirectly release or activate the alarm by biting off the string so that the spring is released or activated and can start the alarm. Circuits for this purpose are enclosed within the control box.

Direction-position Finder.

Should it be desirable to catch certain animals, which still have freedom of movement in spite of having the head surrounded by the trap (i.e. snakes), the trap has been equipped with a direction finding means or sensor in the control box, which is automatically activated by a catch, and by which it is possible to locate the animal in order to prevent it from moving into areas where it is difficult to reach. The trap may be combined with anaesthesia and alarm in order to allow a quick catch.

Window-blind

When the trap is released or activated, the snare constricts behind the head of the animal. As to animals, which are to be caught alive and which for practical reasons ought to be anaesthetised, if they should be too inclined to escape, a flexible back gable with a hole has been inserted, surrounded by a fastened gliding pulling band, which, when stretched, activates the window blind making the hole smaller and squeezing closely around the animal's body whereby the tunnel becomes relatively tight on all sides. In this way the substance, which is emitted or introduced into the tunnel space from the container or spray-bottle, may quickly reach the desired concentration and remain so in the tunnel as any occurring leakage will be negligible.

The window blind also functions as a further locking of the trap around the animal's body—an advantage if the animal tries to shake off the trap.

In case a snake tries to wriggle into a hole in order to hide, the somewhat bulky trap attached around the head of the snake may prevent the animal from entering a smaller hole.

Compartment for Living Bait

In case living bait is preferred, a compartment (a cage) has been arranged with a back wall directed towards the tunnel, where the animal enters. If a snake with its senses perceives the presence of e.g. a living mouse and finds its way towards it, the head of the snake may be registered by a microswitch or a photocell, which then releases or activated the snare and the window blind. The living bait is not a disposable but may be used several times.

Function Description

Thanks to the mechanics built into the unit, only one operation, taking about 3 seconds—is required to activate the unit so it is primed or in an activated state. This entails a considerable time-saving compared to the time needed to bait and prime a conventional snap trap. The risk of getting fingers caught below and under a snap clamp is eliminated as the catch device is totally built-in and enclosed within the trap.

The bait, which tempts the animal to entering the trap, is enclosed in a mini-package emitting enticing perfume or smell through holes. These will be uncovered by pulling off a cover film when priming or activating the trap.

In this way, the bait is protected from strong evaporation and keeps active during a longer time. Also the string constitutes a bait in such a way that it is impregnated with a substance attractive to the animal, thereby tempting the animal to suck and gnaw thereupon until the string breaks and the snare is released or activated.

Rats and mice have an inclination to pass through narrow paths and slots, especially if they can perceive an exit on the other side. Therefore the trap has been shaped as a tunnel, at the one end of which the animal enters, and where a hole has been punched out from the wall at the other end, which has been formed with a transparent window. The animal perceives the tunnel as a passage, which it can pass through, as it cannot consider the window as an obstacle.

As the animal enters the tunnel until it is stopped by the string 31, the jaws of the animal will be situated or positioned in a calculated relationship to the snare 32, which is provided with or formed as several separate slings or loops at a distance of some millimeters from each other. Thus, there is always a possibility or capacity to pull at least one band at the optimal place. The spring is over dimensioned so that the bands offer the possibility to achieve the best effect thanks to a certain yielding capacity (elasticity).

Thanks to the fact that the animal is situated within the tunnel when being killed, all contamination will be spread on the inside and cannot soil the floor or other support surfaces.

The used unit with the enclosed animal may without further precaution be put into the garbage, a refuse chute or into a compost.

When combating animals outdoors, i.e. in composts, thanks to its construction, the trap may be covered with leaves or earth, while the two short gables of the trap are left open allowing the animal to enter the trap and also see through the tunnel part with its window at the other end.

The trap may constitute a natural part of a compost in such a way that it is conceived by the rat as a hole or a passage.

Often traps are placed close to a wall. In order to have the described unit to stand steady on the floor it is supplied with two wings of which one is folded out and forms a support against the ground, while the other long side of the trap rests against the wall. If the trap is placed freely on the ground, both wings may be folded outwardly and down as supports.

Another complement to the unit is constituted by an electric circuit containing among other things a microswitch affected by the spring and a buzzer giving a signal at release or activation—for situations when quick reporting of a catch is important—if it is necessary to locate the trap position in case when a greater number of traps have been set. Emergency action may be required, i.e. on air planes grounded because of a mouse on board, or in the food and pharmaceutical industry.

Evidently, the invention is not restricted to the embodiments given above as examples, but may be exposed to modifications within the scope of the invention illustrated in the following patent claims.

Special attention should be paid to the fact that every shown unit may be combined with any other shown unit within the scope in order to reach the desired technical function.

The invention claimed is:

1. A trap adapted for small animals, comprising:
   a housing having a first end area having a bait cavity defined therein, the housing having a second end area being opposite to the first end area,
   a bait disposed in the bait cavity, the housing having a tunnel portion defined therein,
   a thread device extending across the tunnel portion and demarcating the bait cavity, the thread device blocking passage of an animal into the bait cavity,
   a spring-biased mechanism comprising a spring arrangement which is oriented on an inside of a floor of a bottom section and wall sections of a driving box and placed in the tunnel portion close to the thread device,
   the thread device being adapted to hold the spring-biased mechanism providing a pulling force, the spring-biased mechanism being movable between a loaded position and a released position, the spring-biased mechanism being in operative engagement with a snare arrangement, the snare arrangement being movable into a constricted position by the spring-biased mechanism by breaking the thread device to activate the spring-biased mechanism to pull the snare arrangement into the constricted position,
   a spring unit, belonging to the spring-biased mechanism, being enclosed within the driving box, a first end section of the spring unit being in operative engagement with the thread device and with a band of the snare arrangement,
   the spring unit having a second opposite end section being in operative engagement with an extension means for extending the spring unit,
   means for permitting the spring unit to be locked in an extended position when the spring unit is in a loaded position,
   the driving box having two side-oriented flaps, each flap provided with two holes to deflect bands running toward the second end area of the housing, and
   the means for permitting the spring unit to be locked in an extended position comprising a gable part of the housing having a slot defined therein, and the extension means comprising a pull-band arranged to pass through the slot of the gable part.

2. A trap according to claim 1, characterized in that said pull-band has one or several hook shaped projections close to the spring unit.

3. The trap according to claim 1, characterized in that the first end section of the spring unit is in a joint function with said thread device, a first end section of the thread device is connected to the first end section of the spring unit, where a first thread portion runs a distance within the driving box, a second thread portion runs through a first hole in the bottom section of the driving box, a third thread portion constitutes a demarcation of the bait cavity for the bait, a fourth thread portion runs through a first hole in a platform, a fifth thread portion runs below the platform, a sixth thread portion runs through a second hole in the platform, a seventh thread portion forms the demarcation of the bait cavity for the bait, an eighth thread portion runs through a second hole in the bottom section of the driving box, and a ninth thread portion runs a distance within the driving box.

4. The trap according to claim 1, characterized in that the band comprises a first band which is fastened to the first end section of the spring unit, the first band is adapted to run in a direction towards and to the second end area of the housing where the first band, as through holes in the bottom section of the driving box, connects to the gable part for the second end area of the housing.

5. A trap according to claim 4, characterized in that at a deactivation of the mechanism, constricting the snare arrangement, the gable section will take a closed position.

6. A trap according to claim 4, characterized in that the first band and a second band are co-ordinated close to a folding line between the second end area of the housing.

7. A trap according to claim 4, characterized in that the second end area of the housing has a first gable section with a length exceeding half a height of the tunnel.

8. A trap according to claim 7, characterized in that said first gable section is connected via a folding line to a bottom section of the tunnel portion.

9. A trap according to claim 4, characterized in that the second end area of the housing has a second gable section with a length that is shorter than a width of the tunnel portion.

10. A trap according to claim 9, characterized in that the second gable section is connected to a wall section of the housing via a folding line.

11. A trap according to claim 10, characterized in that the second gable section has a folding line.

12. The trap according to claim 1, characterized in that the band comprises a second band which is fastened to the first end section of the spring unit, the second band is adapted to run in a direction towards and to the second end area of the housing.

13. A trap according to claim 12, characterized in that at a deactivation of the mechanism, constricting the snare arrangement, the snare arrangement will bring into the tunnel a tail portion belonging to a captured small animal.

14. A trap according to claim 1, characterized in that the first end area of the housing is supplied with a gable section serving as a demarcation of the bait cavity.

15. A trap according to claim 14, characterized in that said gable section is supplied with an opening.

16. A trap according to claim 15, characterized in that said opening is covered by a transparent layer.

17. A trap according to claim 1, characterized in that a deactivation of the spring-biased mechanism constricts the snare arrangement so that the small animal will be totally enclosed in the tunnel.

18. A trap according to claim 1, characterized in that the tunnel portion is formed by a first folded cardboard material and that the driving box is formed by a co-ordination with a folded second cardboard material.

19. A trap according to claim 18, chararterized in that the first cardboard material has connecting flaps.

20. A trap according to claim 1, characterized in that flaps are centered in relationship to the snare arrangement.

* * * * *